Patented May 5, 1925.

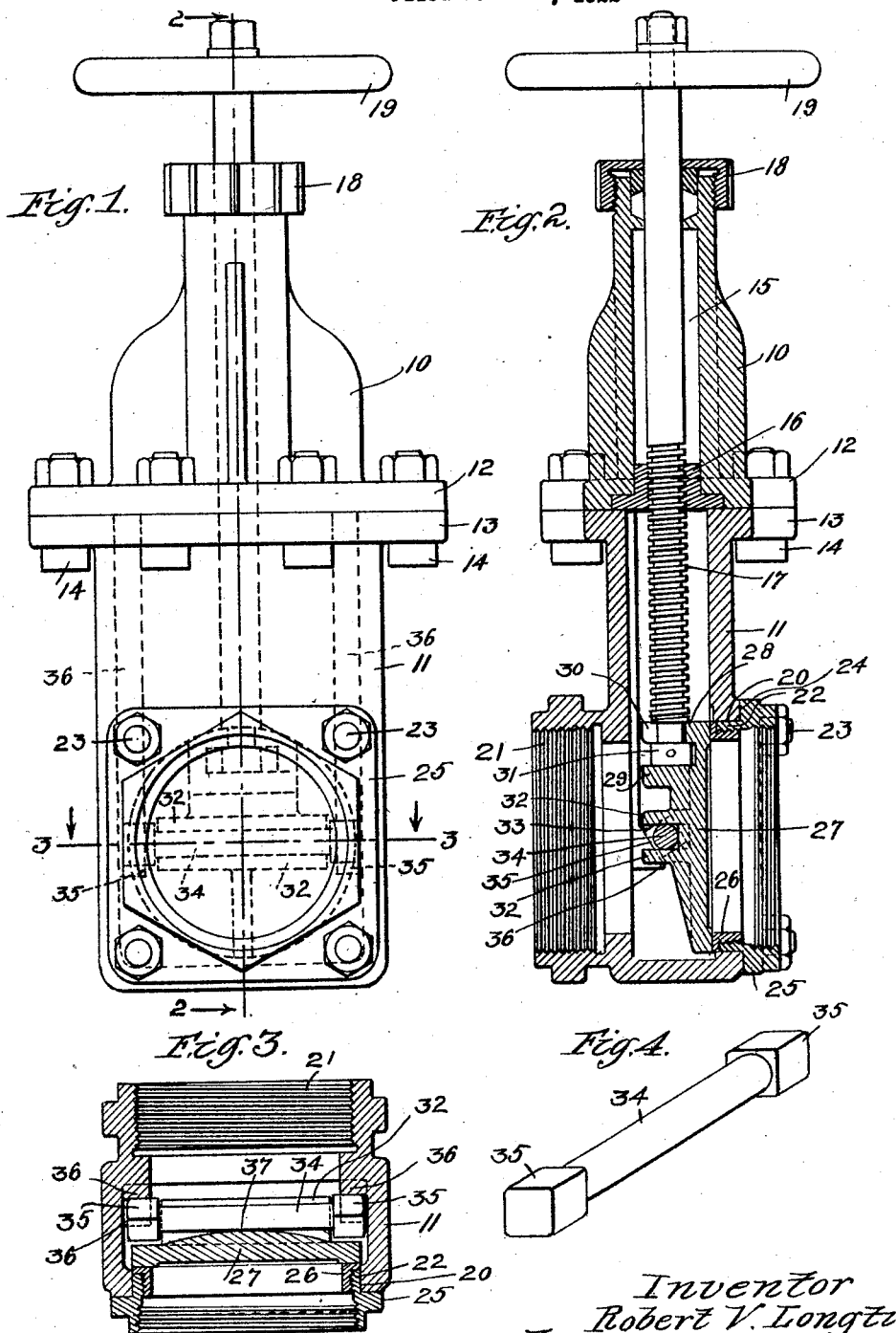

1,536,300

UNITED STATES PATENT OFFICE.

ROBERT V. LONGTINE, OF LOS ANGELES, CALIFORNIA, ASSIGNOR TO LONGTINE VALVE COMPANY, A CORPORATION OF CALIFORNIA.

GATE VALVE.

Application filed February 27, 1922. Serial No. 539,448.

*To all whom it may concern:*

Be it known that I, ROBERT V. LONGTINE, a citizen of the United States, residing at Los Angeles, in the county of Los Angeles and State of California, have invented new and useful Improvements in Gate Valves, of which the following is a specification.

My invention relates to gate valves and more particularly to that class of gate valves whereby the gate is operated by means of a stem threaded into the casing of the valve.

In the employment of gate valves of the usual type it has heretofore been found necessary to disconnect and remove the valve from the piping system when it was desired to repair the seat of the valve, the threads for the valve stem, or other parts, thereby involving a waste of time as well as keeping the system out of commission during the operation.

It is the object of my invention to overcome the above recited disadvantages by providing a construction whereby it will be unnecessary to remove the valve from its adjusted position while making the repairs or supplying new parts.

It is a further object of my invention to provide an improved construction for automatically adjusting the valve gate evenly and impinging and holding it tightly upon its seat.

Other objects of my invention will be more fully disclosed in the following description, and will be illustrated in the accompanying drawings, in which:

Fig. 1 is a front view of a valve embodying my invention.

Fig. 2 is a vertical section through the same taken on the line 2—2 of Fig. 1, viewed in the direction of the arrows.

Fig. 3 is a transverse section through the same taken on the line 3—3 of Fig. 1, viewed in the direction indicated by the arrows.

Fig. 4 is a detail perspective view of one of the parts of my invention.

In carrying out my invention 10 and 11 represent respectively top and bottom valve housing members provided with suitable opposed flanges 12 and 13 adapted to receive the bolts 14 by which said members are securely fastened together. The member 10 is provided with a bore 15 in which is inserted a nut member 16 provided with an internally threaded bore adapted to receive the threaded valve gate stem 17. The nut member 16 is preferably formed of a softer metal than the valve gate stem 17 and is provided with a flange adapted to be interposed between the members 10 and 11 and to be firmly clamped against rotation thereby. By this construction it will be obvious that by removing the member 10 the nut member 16 may be readily removed when worn or damaged, and a new one substituted therefor without the necessity of disconnecting the rest of the valve housing from the piping system.

The valve gate stem 17 passes upwardly and outwardly through a suitable packing gland 18 and is provided with the usual revolvable handle 19, as clearly shown in Fig. 2 of the drawings.

The housing 11 is provided at its lower end with oppositely disposed inlet and outlet ports 20 and 21, the port 21 being suitably internally threaded to receive a pipe connection (not shown). Mounted in the bore 20 is a sleeve member 22 adapted to project therein and secured in position by means of the stud bolts 23 which extend from a pad 24 on member 11 and pass through a flange 25 on sleeve member 22.

The inwardly projecting end of the bore of sleeve member 22 is threaded and adapted to receive the gate seat member 26, and the outer end of said sleeve member is also threaded to receive an inlet pipe (not shown).

A gate member 27 is adapted to be reciprocated over and held in closely adjusted contact with the seat member 26 in the following manner; The gate member 27 is provided adjacent its upper edge with a pair of oppositely disposed lugs 28 and 29. The upper lug 28 is provided with a slot 30 for the reception of a reduced portion of the lower end of the stem 17 and secured to said lower end and adapted to engage in the space formed between the lugs 28 and 29 is a collar 31. By this construction it will be obvious that a swivel joint is formed between the gate and stem and upon a manipulation of the stem the gate may be moved across and away from the seat 26.

The gate member 27 is provided with a pair of ribs 32 arranged in parallel relation and spaced suitably apart to form a channel 33 into which is disposed a round rod 34, the ends of which being squared as at 35 and adapted to project beyond the ends of the ribs 32 and to engage with the oppositely disposed cam tracks 36 formed integral with housing member 11. The bottom wall of the channel 33 is arched as at 37 (see Fig. 3) to provide a single point of contact for the center of the rod 34. By this construction it will be obvious that when the gate 27 is moved into closed position by means of the stem 17 the squared ends of the rod 34 will engage with the cam tracks 36 and thus the gate will be forced thereby upon the seat 26 and will become automatically adjusted thereon by reason of the single point of contact of the rod 34 with the seat which permits the seat to rock thereon in two directions. By squaring the ends of the rod 34 it will be obvious that a greater area of contact of said rod with the rocks 36 will be attained, thus eliminating the wear on these parts.

From the foregoing description it will be apparent that when the valve seat 26 becomes worn or abraded it will only be necessary to disconnect the pipe from the sleeve member 22 and then remove said sleeve member from the housing 11, thus permitting of the substitution of a new valve seat. Should the threads in the nut member 16 become worn it will only be necessary to remove the housing 10 to substitute a new nut.

What I claim is:

1. A gate valve construction comprising a housing having oppositely disposed inlet and outlet ports, a gate valve mounted in said housing, the non-seating face of said valve being convex in form, means to reciprocate said valve, a pair of cam tracks mounted in said housing, one on either side of one of said ports, and a cylindrical rod loosely carried by said gate valve, the ends of said rod engaging the cam tracks and exerting pressure at a single point on the convexed face of said gate on a seating operation.

2. A gate valve construction, comprising a housing provided with inlet and outlet ports, a gate valve adapted for reciprocation in said housing and to engage with a seat surrounding one of the ports, said gate valve being provided with a transverse groove which is shallower at its center than at its ends, a round rod provided with squared ends mounted in said groove, and a pair of oppositely disposed cam tracks mounted in said housing adapted to engage with the squared ends of said rod to force said gate valve against the seat.

3. A gate valve construction comprising a casing provided with fluid inlet and outlet ports, one of said ports being provided with a valve seat therearound, a vertically reciprocable gate valve mounted within said casing and means for reciprocating the same, one face of said valve being convex in form, a pair of vertically disposed cam tracks formed on said casing opposite to the convexed face of said gate valve, transversely disposed bearings formed on said gate valve, and a cylindrical rod loosely mounted in said bearings, the ends of said rod solely engaging the cam tracks and its surface engaging the convexed face of the gate valve, whereby to permit a rocking motion of said rod during a seating operation of the gate valve.

In witness that I claim the foregoing I have hereunto subscribed my name this 3rd day of February, 1922.

R. V. LONGTINE.